US011048755B2

(12) United States Patent
Tomlinson

(10) Patent No.: US 11,048,755 B2
(45) Date of Patent: Jun. 29, 2021

(54) KEY-VALUE STORE TREE WITH SELECTIVE USE OF KEY PORTION

(71) Applicant: Micron Technology, Inc., Boise, ID (US)

(72) Inventor: Alexander Tomlinson, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 58 days.

(21) Appl. No.: 16/220,729

(22) Filed: Dec. 14, 2018

(65) Prior Publication Data

US 2020/0192940 A1 Jun. 18, 2020

(51) Int. Cl.
*G06F 16/901* (2019.01)
*G06F 16/903* (2019.01)

(52) U.S. Cl.
CPC .... *G06F 16/9027* (2019.01); *G06F 16/90348* (2019.01)

(58) Field of Classification Search
CPC .......... G06F 16/90348; G06F 16/9027; G06F 16/2246; G06F 16/9014; G06F 16/2255
See application file for complete search history.

(56) References Cited

U.S. PATENT DOCUMENTS

| 5,204,958 | A | 4/1993 | Cheng et al. |
| 5,530,850 | A | 6/1996 | Ford et al. |
| 6,175,835 | B1 * | 1/2001 | Shadmon ............ G06F 16/2246 707/696 |
| 6,597,957 | B1 | 7/2003 | Beakley |
| 8,738,657 | B2 | 5/2014 | Kuno et al. |
| 9,075,710 | B2 | 7/2015 | Talagala et al. |
| 9,367,260 | B1 | 6/2016 | Natanzon |
| 9,400,816 | B1 | 7/2016 | Gubarev et al. |
| 9,858,301 | B1 | 1/2018 | Hardy et al. |

(Continued)

FOREIGN PATENT DOCUMENTS

| CN | 101515298 | 9/2013 |
| CN | 105095287 | 11/2015 |

(Continued)

OTHER PUBLICATIONS

Bagwell, Phil. "Ideal Hash Trees". EPFL Technical Report, (2001). (Year: 2001).*

(Continued)

*Primary Examiner* — Tamara T Kyle
*Assistant Examiner* — Lana Alagic
(74) *Attorney, Agent, or Firm* — Schwegman Lundberg & Woessner, P.A.

(57) ABSTRACT

Aspects of the present disclosure provide various embodiments for selective use of a portion of a key, such as a prefix of the key (also referred to as a key prefix of a key), with respect to a key-value store (KVS) tree data structure, such as when storing a key-value pair (associated with the key) within the KVS tree data structure or navigating through the KVS tree data structure. For some embodiments, when navigating a KVS tree based on a key, a first set of levels (e.g., a first series of levels) of the KVS tree is navigated by a first portion (e.g., a prefix) of the key, and a second set of levels (e.g., a second series of levels) of the KVS tree is navigated by a second portion (e.g., an entire portion) of the key.

20 Claims, 8 Drawing Sheets

(56) References Cited

U.S. PATENT DOCUMENTS

| | | |
|---|---|---|
| 10,235,257 B1 | 3/2019 | Danilov et al. |
| 10,706,105 B2 | 7/2020 | Boles |
| 10,706,106 B2 | 7/2020 | Boles et al. |
| 10,719,495 B2 | 7/2020 | Boles et al. |
| 10,725,988 B2 | 7/2020 | Boles et al. |
| 10,852,978 B2 | 12/2020 | Kurichiyath et al. |
| 10,915,546 B2 | 2/2021 | Tomlinson |
| 2005/0165865 A1 | 7/2005 | Farmer |
| 2005/0171960 A1 | 8/2005 | Lomet |
| 2008/0016066 A1 | 1/2008 | Kuznetsov et al. |
| 2010/0146003 A1 | 6/2010 | Bruso et al. |
| 2010/0246446 A1 | 9/2010 | Du et al. |
| 2011/0246503 A1 | 10/2011 | Bender et al. |
| 2012/0011106 A1 | 1/2012 | Reid et al. |
| 2012/0072656 A1 | 3/2012 | Archak et al. |
| 2012/0223889 A1 | 9/2012 | Medlock et al. |
| 2012/0278335 A1* | 11/2012 | Bentkofsky ......... G06F 16/2272 707/743 |
| 2013/0080473 A1 | 3/2013 | Kuno et al. |
| 2013/0117524 A1 | 5/2013 | Helman et al. |
| 2013/0204902 A1 | 8/2013 | Wang et al. |
| 2013/0218840 A1 | 8/2013 | Smith et al. |
| 2013/0275656 A1 | 10/2013 | Talagala et al. |
| 2013/0306276 A1 | 11/2013 | Duchesneau |
| 2014/0064490 A1 | 3/2014 | Wang et al. |
| 2014/0074841 A1 | 3/2014 | Majnemer et al. |
| 2014/0082028 A1 | 3/2014 | Sivasubramanian et al. |
| 2014/0129530 A1 | 5/2014 | Raufman |
| 2014/0222870 A1* | 8/2014 | Zhang ................. G06F 16/2246 707/797 |
| 2014/0279944 A1 | 9/2014 | Ghandeharizadeh et al. |
| 2014/0344287 A1 | 11/2014 | Carvalho et al. |
| 2015/0058291 A1 | 2/2015 | Earl et al. |
| 2015/0127658 A1 | 5/2015 | Ding et al. |
| 2015/0178375 A1 | 6/2015 | Ishizaki |
| 2015/0244558 A1 | 8/2015 | Tully et al. |
| 2015/0254272 A1 | 9/2015 | Regni et al. |
| 2015/0286695 A1 | 10/2015 | Kadayam et al. |
| 2015/0293958 A1 | 10/2015 | Chen et al. |
| 2015/0347495 A1 | 12/2015 | Wang et al. |
| 2016/0026666 A1 | 1/2016 | Namiki |
| 2016/0173445 A1 | 6/2016 | Mosko et al. |
| 2016/0275094 A1 | 9/2016 | Lipcon |
| 2016/0335299 A1* | 11/2016 | Vemulapati ......... G06F 16/2246 |
| 2017/0017411 A1 | 1/2017 | Choi et al. |
| 2017/0141791 A1 | 5/2017 | Balegar et al. |
| 2017/0185622 A1 | 6/2017 | Prahlad et al. |
| 2017/0192989 A1 | 7/2017 | Georgiev et al. |
| 2017/0212680 A1 | 7/2017 | Waghulde |
| 2018/0011766 A1 | 1/2018 | Lee et al. |
| 2018/0067975 A1 | 3/2018 | Kato et al. |
| 2018/0089074 A1 | 3/2018 | Li et al. |
| 2018/0225315 A1 | 8/2018 | Boles et al. |
| 2018/0225316 A1 | 8/2018 | Boles et al. |
| 2018/0225321 A1 | 8/2018 | Boles et al. |
| 2018/0225322 A1 | 8/2018 | Boles et al. |
| 2018/0253386 A1 | 9/2018 | Qiu et al. |
| 2019/0034427 A1 | 1/2019 | Trika et al. |
| 2019/0065557 A1 | 2/2019 | Boles et al. |
| 2020/0004851 A1* | 1/2020 | Lambov ............. G06F 16/2255 |
| 2020/0117728 A1 | 4/2020 | Tomlinson et al. |
| 2020/0117744 A1 | 4/2020 | Tomlinson |
| 2020/0192590 A1 | 6/2020 | Kurichiyath et al. |
| 2020/0210482 A1 | 7/2020 | Becker et al. |
| 2020/0257669 A1 | 8/2020 | Boles et al. |
| 2020/0334294 A1 | 10/2020 | Boles et al. |
| 2020/0334295 A1 | 10/2020 | Boles et al. |
| 2020/0349139 A1 | 11/2020 | Boles et al. |
| 2021/0133208 A1 | 5/2021 | Tomlinson |

FOREIGN PATENT DOCUMENTS

| | | |
|---|---|---|
| CN | 110268394 A | 9/2019 |
| CN | 110268399 A | 9/2019 |
| CN | 110291518 A | 9/2019 |
| CN | 110383261 A | 10/2019 |
| KR | 20130018602 A | 2/2013 |
| KR | 20130115929 A | 10/2013 |
| KR | 20170008152 A | 1/2017 |
| TW | 200421114 | 10/2004 |
| TW | 200822066 | 5/2008 |
| TW | 200836084 | 9/2008 |
| TW | 201342088 | 10/2013 |
| TW | 201408070 | 2/2014 |
| TW | I454166 | 9/2014 |
| TW | 201837720 | 10/2018 |
| TW | 201841122 | 11/2018 |
| TW | 201841123 | 11/2018 |
| TW | 201842454 | 12/2018 |
| WO | 2018148149 | 8/2018 |
| WO | 2018148151 | 8/2018 |
| WO | 2018148198 | 8/2018 |
| WO | 2018148203 | 8/2018 |
| WO | WO-2020076580 A1 | 4/2020 |
| WO | WO-2020076581 A1 | 4/2020 |
| WO | WO-2020123628 A1 | 6/2020 |
| WO | WO-2020123632 A1 | 6/2020 |

OTHER PUBLICATIONS

"International Application Serial No. PCT/US2018/016892, International Preliminary Report on Patentability dated Aug. 22, 2019", 11 pgs.

"International Application Serial No. PCT/US2018/016906, International Preliminary Report on Patentability dated Aug. 22, 2019", 11 pgs.

"International Application Serial No. PCT/US2018/017043, International Preliminary Report on Patentability dated Aug. 22, 2019", 9 pgs.

"International Application Serial No. PCT/US2018/017056, International Preliminary Report on Patentability dated Aug. 22, 2019", 9 pgs.

"Taiwanese Application Serial No. 107104242, Office Action dated Oct. 2, 2019", w/ English translation, 31 pgs.

"Taiwanese Application Serial No. 107104545, Voluntary Amendment Filed Sep. 5, 2019", w/ English Claims. 113 pgs.

"Taiwanese Application Serial No. 107104566, Response filed Aug. 15, 2019 to First Office Action dated Feb. 14, 2019", w/ English Claims, 104 pgs.

"International Application Serial No. PCT/US2019/054243, International Search Report dated Jan. 22, 2020", 3 pgs.

"International Application Serial No. PCT/US2019/054243, Written Opinion dated Jan. 22, 2020", 4 pgs.

"International Application Serial No. PCT/US2019/054254, International Search Report dated Jan. 15, 2020", 3 pgs.

"International Application Serial No. PCT/US2019/054254, Written Opinion dated Jan. 15, 2020", 4 pgs.

"International Application Serial No. PCT/US2019/065692, International Search Report dated Apr. 3, 2020", 3 pgs.

"International Application Serial No. PCT/US2019/065692, Written Opinion dated Apr. 3, 2020", 4 pgs.

"International Application Serial No. PCT/US2019/065702, International Search Report dated Apr. 3, 2020", 3 pgs.

"International Application Serial No. PCT/US2019/065702, Written Opinion dated Apr. 3, 2020", 5 pgs.

"Taiwanese Application Serial No. 107104242, Response filed Jan. 2, 2020 to Office Action dated Oct. 2, 2019", w/ English Claims, 103 pgs.

"Taiwanese Application Serial No. 107104566, Decision of Rejection dated Jan. 20, 2020", w/ English Translation, 7 pgs.

U.S. Appl. No. 16/856,920, filed Apr. 23, 2020, titled KVS Tree.

U.S. Appl. No. 16/921,371, filed Jul. 6, 2020, titled Merge Tree Garbage Metrics.

U.S. Appl. No. 16/921,309, filed Jul. 6, 2020, titled Merge Tree Modifications for Maintenance Operations.

"International Application Serial No. PCT US2018 017043, International Search Report dated May 28, 2018", 3 pgs.

(56) References Cited

OTHER PUBLICATIONS

"International Application Serial No. PCT US2018 017043, Written Opinion dated May 28, 2018", 7 pgs.
"International Application Serial No. PCT US2018 016892, International Search Report dated Jun. 4, 2018", 3 pgs.
"International Application Serial No. PCT US2018 016892, Written Opinion dated Jun. 4, 2018", 9 pgs.
"International Application Serial No. PCT US2018 016906, International Search Report dated Jun. 4, 2018", 3 pgs.
"International Application Serial No. PCT US2018 016906, Written Opinion dated Jun. 4, 2018", 9 pgs.
"International Application Serial No. PCT US2018 017056, International Search Report dated Jun. 4, 2018", 4 pgs.
"International Application Serial No. PCT US2018 017056, Written Opinion dated Jun. 4, 2018", 7 pgs.
"NVM Express Revision 1.2 specification", NVM Express, [Online] Retrieved from the internet:http: nvmexpress.org resources specifications, (Nov. 3, 2014), 1-205.
"Taiwanese Application Serial No. 107104545, Office Action dated Dec. 21, 2018", W English Translation, 17 pgs.
"U.S. Appl. No. 15/428,951, Non Final Office Action dated Jan. 7, 2019", 29 pgs.
"Taiwanese Application Serial No. 107104550, Office Action dated Jan. 9, 2019", W English Translation, 28 pgs.
"U.S. Appl. No. 15/428,877, Non Final Office Action dated Jan. 23, 2019", 39 pgs.
"U.S. Appl. No. 15/428,912, Non Final Office Action dated Jan. 23, 2019", 36 pgs.
"U.S. Appl. No. 15/428,976, Non Final Office Action dated Jan. 28, 2019", 34 pgs.
"Taiwanese Application Serial No. 107104566, First Office Action dated Feb. 14, 2019", w English Translation, 36 pgs.
"Taiwanese Application Serial No. 107104242, Office Action dated Feb. 25, 2019", w English Translation, 22 pgs.
"Taiwanese Application Serial No. 107104545, Response filed Mar. 19, 2019 to Office Action dated Dec. 21, 2018", w English Claims, 15 pgs.
"Transaction Log", Wikipedia, (Accessed on Apr. 8, 2019), 3 pgs.
"U.S. Appl. No. 15/428,951, filed Apr. 8, 2019 to Non Final Office Action dated Jan. 7, 2019", 21 pgs.
"Taiwanese Application Serial No. 107104545, First Office Action dated Apr. 11, 2019", w English translation, 44 pgs.
"Xingbo Wu and Yuehai Xu", LSM-trie: An LSM-tree-based Ultra-Large Key-Value Store for Small Data, https: www.usenix.org system files conference atc15 atc15-paper-wu.pdf, (Jul. 8-10, 2015), 13 pgs.
"Taiwanese Application Serial No. 107104550, Response filed Apr. 11, 2019 to Office Action dated Jan. 9, 2019", w English Claims, 93 pgs.
"U.S. Appl. No. 15/428,877, filed May 23, 2019 to Non Final Office Action dated Jan. 23, 2019", 18 pgs.
"U.S. Appl. No. 15/428,912, filed May 23, 2019 to Non Final Office Action dated Jan. 23, 2019", 15 pgs.
"U.S. Appl. No. 15/428,976, filed May 24, 2019 to Non Final Office Action dated Jan. 28, 2019", 15 pgs.
"Taiwanese Application Serial No. 107104242, Response filed Jun. 4, 2019 to Office Action dated Feb. 25, 2019", w English Claims, 105 pgs.
"Taiwanese Application Serial No. 107104545, Response filed Jul. 12, 2019 to First Office Action dated Apr. 11, 2019", w English Claims, 124 pgs.
Amur, Hrishikesh, "Design of a Write-Optimized Data Store", [Online] Retrieved from the internet:https: smartech.gatech.edu handle 1853 53627, (2013), 12 pgs.
Clements, Austin T, "Scalable Address Spaces Using RCU Balanced Trees", (2012), 12 pgs.
Ghosh, Mainak, "Fast Compaction Algorithms for NoSQL Databases", IEEE 35th International Conference on Distributed Computing Systems, (2015), 10 pgs.
Kang, Jeong-Uk, "The Multi-streamed Solid-State Drive", 5 pgs.
Lim, Heyontaek, "Towards Accurate and Fast Evaluation of Multi-Stage Log-Structured Designs", USENIX Association 14th USENIX Conference on File and Storage Technologies FAST 16, (2016), 149-166.
Lu, Lanyue, "WiscKey: Separating Keys from Values in SSD-conscious Storage", 14th USENIX Conference, (2016), 17 pgs.
O'Neil, Patrick E., "The Log-Structured Merge-Tree", ACTA Informatica 33(4), (1996).
Papapetrou, Odysseas, "Cardinality estimation and dynamic length adaptation for Bloom filters", 34 pgs.
Peng, Wang, "An Efficient Design and Implementation of LSM-Tree based Key-Value Store on Open-Channel SSD", Proceedings of the Ninth European Conference on Computer Systems (EuroSys 2014), Article No. 6, (Apr. 2014), 14 pgs.
Putze, Felix, "Cache-, Hash- and Space-Efficient Bloom Filters", (2007), 14 pgs.
Trong-Dat, Nguyen, "Opportunity of using Multi-Streamed SSD in MongoDB", In: Korea Computer Congress 2016, [Online] Retrieved from the internet:http: www.dbpia.co.kr Article NODE07018146, (Jun. 2016), 169-171.
Xingbo, Wu, "LSM-trie: An LSM-tree-based Ultra-Large Key-Value Store for Small Data", Proceedings of 2015 USENIX Annual Technical Conference,, (Jul. 8-10, 2015), 71-82.
Yuzhe, Tang, "Deferred Lightweight Indexing for Log-Structured Key-Value Stores", 15th IEEE ACM International Symposium on Cluster, Cloud and Grid Computing (CCGrid), (May 4-7, 2015), 10 pgs.
"Korean Application Serial No. 10-2019-7026304, Notice of Preliminary Rejection dated Nov. 30, 2020", w/ English translation, 9 pgs.
"Korean Application Serial No. 10-2019-7026327, Response filed Dec. 18, 2020 to Notice of Preliminary Rejection dated Oct. 19, 2020", w/ English Claims, 51 pgs.
"Korean Application Serial No. 10-2019-7026330, Notice of Preliminary Rejection dated Nov. 30, 2020", w/ English translation, 10 pgs.
"Korean Application Serial No. 10-2019-7026533, Notice of Preliminary Rejection dated Dec. 26, 2020", w/ English translation, 12 pgs.
"Korean Application Serial No. 10-2019-7026327, Notice of Preliminary Rejection dated Oct. 19, 2020", w/ English translation, 20 pgs.
"Taiwanese Application Serial No. 107104566, Response filed Jul. 28, 2020 to Decision of Rejection dated Jan. 20, 2020", w/ English Claims, 36 pgs.
U.S. Appl. No. 16/933,532, filed Jul. 20, 2020, titled Stream Selection for Multi-Stream Storage Devices.
U.S. Appl. No. 17/094,532, filed Nov. 10, 2020, titled Key-Value Store Using Journaling With Selective Data Storage Format.
U.S. Appl. No. 17/146,222, filed Jan. 11, 2021, titled Counter-Based Compaction of Key-Value Store Tree Data Block.
U.S. Appl. No. 17/164,299, filed Feb. 1, 2021, titled Data Tree With Order-Based Node Traversal.
U.S. Appl. No. 15/428,877, filed Feb. 9, 2017, titled KVS Tree.
U.S. Appl. No. 15/428,912, filed Feb. 9, 2017, titled Merge Tree Garbage Metrics.
U.S. Appl. No. 15/428,951, filed Feb. 9, 2017, titled Merge Tree Modifications for Maintenance Operations.
U.S. Appl. No. 15/428,976, filed Feb. 9, 2017, titled Stream Selection for Multi-Stream Storage Devices.
U.S. Appl. No. 16/220,646, filed Dec. 14, 2018, titled Key-Value Store Using Journaling With Selective Data Storage Format.
U.S. Appl. No. 16/156,440, filed Oct. 10, 2018, titled Key-Value Store Tree Data Block Spill With Compaction.
U.S. Appl. No. 16/156,400, filed Oct. 10, 2018, titled Counter-Based Compaction of Key-Value Store Tree Data Block.
U.S. Appl. No. 16/232,422, filed Dec. 26, 2018, titled Data Tree With Order-Based Node Traversal.
"International Application Serial No. PCT US2019 054254, International Preliminary Report on Patentability dated Apr. 22, 2021", 6 pgs.

* cited by examiner

KEY-VALUE STORE TREE WITH SELECTIVE USE OF KEY PORTION

TECHNICAL FIELD

Embodiments of the disclosure relate generally to memory sub-systems and more specifically, to operation of a key-value store (KVS) tree data structure.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
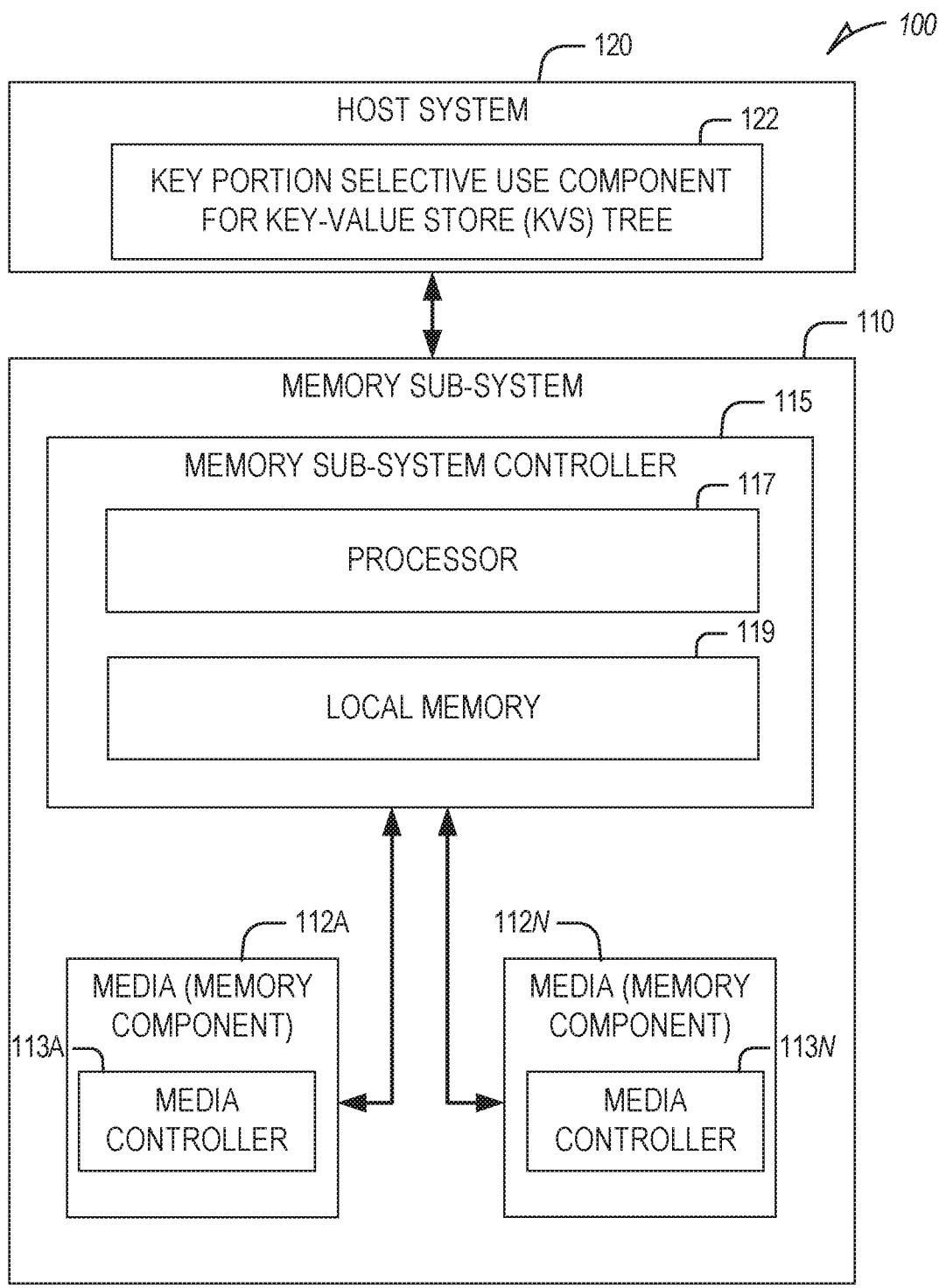
FIG. 1 is a block diagram illustrating an example computing environment including a memory sub-system, in accordance with some embodiments of the present disclosure.

Aspects of the present disclosure are directed to selective use of a prefix of a key to store a key-value pair (associated with the key) within a key-value tree data structure. A memory sub-system is also hereinafter referred to as a "memory device." An example of a memory sub-system is a storage system, such as a SSD. In some embodiments, the memory sub-system is a hybrid memory/storage sub-system. In general, a host system can utilize a memory sub-system that includes one or more memory components. The host system can provide data (e.g., via write requests) to be stored at the memory sub-system and can request data to be retrieved (e.g., via read requests) from the memory sub-system.

A memory sub-system can include multiple memory components that can store data from the host system. The memory sub-system can further include a memory sub-system controller that can communicate with each of the memory components to perform operations such as reading data, writing data, or erasing data at the memory components in response to requests received from the host system. Any one or more of the memory components of the memory sub-system may include a media controller to manage memory cells of the memory component, communicate with the memory sub-system controller, and execute memory requests (e.g., read or write) received from the memory sub-system controller.

In some applications, such as database storage and volume data storage (e.g., cloud storage), key-value data structures are used to store data on data storage media, such as a pool of data storage media (media pool) implemented by one or more memory devices and presented as a single logical data storage volume comprising one or more media data blocks (media blocks). A key-value store (KVS) can comprise one or more key-value data structures to store and search for key-value pairs. The key-value data structures can permit efficient searches of stored data of key-value pairs, permit efficient storage of sparse data, or permit efficient storage of searchable data. Generally, key-value data structures accept a key-value pair for storage and are configured to respond to queries for a value based on a key. Key-value data structures may comprise such structures as tree data structures, examples of which include log-structured merge tree (LSM tree) and a key-value store (KVS) tree (also referred to herein as a key-value store tree data structure or KVS tree data structure).

For various embodiments described herein, a KVS tree comprises a radix tree data structure, which can distribute (within the KVS tree) a value associated with a key (e.g., key-value pair) based on a hash of at least a portion of the key (e.g., hash of a prefix of the key or the entire key). For example, key-value pairs are stored at tree nodes and keys are used to navigate from the tree's root node to the node that stores a key-value pair associated with a given key. The node that stores a given key's key-value pair can be determined by a bit string that represents the key (e.g., a hash of the key), where the bit string can be consumed a few bits at a time to navigate the tree. For instance, if the bit string representing a key (e.g., hash of the key) is "01001110" and bits are consumed two bits at a time, then the sequence of two bit chunks would be "01", "00", "11", and "10," which correspond to integer values 1, 0, 3, and 2. Accordingly, the navigation of the KVS tree based on this bit string could comprise: start at the root node of the KVS, navigate to child node #1 at level one of the KVS tree based on "01"; from that node navigate to child node #0 at level two of the KVS tree based on "00"; then navigate to child node #2 at level three of the KVS tree based on "11"; and finally navigate to child node #3 at level four of the KVS tree based on "10". If a key-value pair associated with the key is stored in the KVS, it would be stored in the last node in the sequence (e.g., child node #3 at level four).

Depending on the embodiment, the number of levels (or edges) of the KVS tree that can be navigated based on a given key can depend on the number of bits of a bit string representing the given key (e.g., hash of a key prefix or an entire key) that are used (e.g., consumed) to navigate each level/edge of the tree. For instance, a hash of a key (e.g., key prefix or entire key) can result in a hash value comprising a 64-bit bit string, and where navigating each level of the KVS tree consumes two bits of a hit string representing a key, the 64-bit string would facilitate navigation of up to 32 levels of a KVS tree. In another instance, where each level of the KVS tree consumes four bits, a 64-bit string would facilitate navigation of up to 16 levels of a KVS tree.

Aspects of the present disclosure provide various embodiments for selective use of a portion of a key (also referred to herein as a key portion), such as a prefix of the key (also referred to as a key prefix of a key), with respect to a key-value tree data structure (KVS tree), such as when storing a key-value pair (associated with the key) within the KVS tree or navigating through the KVS tree. Storage of key-value pairs within the KVS tree based on selective use of key portions (e.g., key prefixes) may also be referred to herein as distribution of key-value pairs within the KVS tree based on key portions (e.g., key prefixes). For some embodiments, when navigating a KVS tree based on a key (e.g., searching for a key-value pair or storing a key-value pair in a node of the KVS tree), a first set of levels (e.g., a first series of levels) of the KVS tree is navigated by a first portion (e.g., a partial portion, such as a prefix) of the key, and a second set of levels (e.g., a second series of levels) of the KVS tree is navigated by a second portion (e.g., an entire portion) of the key. For example, the first L levels of the KVS tree can be navigated by a bit string generated based on a partial portion of a key (e.g., hash of the partial portion of the key), while level L+1 and below of the KVS tree can be navigated with a bit string generated based on a full portion of the key (e.g., hash of the full portion of the key). Additionally, for some embodiments, when navigating a KVS tree based on a key, a first set of levels of the KVS tree is navigated by a first portion (e.g., first prefix) of the key, a second set of levels of the KVS is navigated by a second portion second prefix) of the key that is different from the first prefix, and a third set of levels of the KVS tree is navigated by a third portion (e.g., an entire portion) of the key. Some embodiments involve more than four or more sets of levels, where each set of levels uses a different portion of the key. Additionally, depending on the embodiment, different portions of a key may or may not overlap. For some embodiments, a set of levels of a KVS tree comprises a series of levels of the KVS tree. For instance, a first set of levels of a KVS tree can comprise a first level of the KVS tree to level L, and a second set of levels of the KVS tree can comprise level L+1 to the last level of the KVS tree. Accordingly, various embodiments selectively use different portions of a key within a KVS tree by using different portions of a given key when performing operations (e.g., navigating the KVS tree or storing key-value pairs in the KVS tree) with respect to different sets of levels of the KVS tree.

A portion of a key can comprise less than all of the key, such as a key prefix, while another portion of the key can comprise all of the key (i.e., entire portion of the key). For some embodiments, a prefix of a key comprises the first N number of bytes or characters of the key, where the N can be regarded as the length of the prefix. For instance, a prefix of a key can comprise the first 8 bytes of the key (an 8-byte prefix). In another instance, a first prefix of a key can comprise the first 8 bytes of the key (an 8-byte prefix), while a second prefix of the key can comprise the first 16 bytes of the key (a 16-byte prefix). In another instance, a prefix of a key can comprise the first two characters (e.g., ASCII characters) of the key. In another instance, a first prefix of a key can comprise the first two characters (e.g., ASCII characters) of the key, and a second prefix of the key can comprise the first four characters of the key.

For some embodiments, a given prefix is associated with a given set of levels (e.g., series of levels) of a KVS tree, and is associated with a given operation/function (e.g., hash function) for generating a bit string from the given prefix. Accordingly, for some embodiments, two different prefixes are associated with two different operations/functions (e.g., hash functions) for generating bit strings based on a prefix.

Some embodiments implement a technique for navigating a KVS tree based on a given key by navigating a first L number of levels (e.g., a first series of levels) of the KVS tree using a bit string generated (e.g., by a first hash function) based on a first N number of bytes of the given key, and navigating levels L+1 and below (e.g., a second series of levels) of the KVS tree using a bit string generated (e.g., by a second hash function) based on an entire portion of the given key. By this technique, locality can be preserved because any given iteration will still iterate over a small subset of all the nodes in the tree, and degeneration can be prevented because a bit string (e.g., hash) of the entire portion of the given key is used at level L+1 and below.

Traditionally, a KVS tree can operate in a prefix mode where a prefix of a particular key is hashed to determine the particular key's bit string, which can provide locality within the KVS tree—keys having the same prefix navigate to the same parts of the KVS tree and their associated values are stored along a common navigation path. With locality, a KVS tree can provide efficiencies when iterating over keys that are part of a collection (e.g., when finding values in the KVS tree for a set of keys with a common prefix key). Unfortunately, operating a KVS tree in only prefix mode can cause the KVS tree to degenerate to an unbalanced tree (extent of degeneration usually depends on the distribution of keys among the set of possible prefixes), which can cause the KVS tree to operate inefficiently (e.g., inefficient search, access, and storage operations).

Various embodiments described herein can enable a KVS tree to maintain a balanced tree while using one or more prefixes of a key to store (and subsequently navigate) to a node of the KVS tree storing a key-value pair associated with the key (e.g., the key's associated value). Various embodiments described herein cause key-value pairs to be distributed to nodes of a KVS tree based two or more different portions of a key (e.g., one or more prefixes of a key and then an entire portion of the key), which can provide for locality when looking within the KVS tree for values of a set of keys with a common prefix while avoiding a distribution that would cause the KVS tree to become unbalanced. Accordingly, use of an embodiment described herein can improve a computer system's ability to access (e.g., read and write) key-value pairs on a KVS tree.

As used herein, a KVS tree comprises a tree data structure comprising nodes with connections between parent and child nodes based on a predetermined derivation of a key (e.g., rather than the content of the tree). According to various embodiments, data within a node of the KVS tree comprises a set of key blocks (for storing keys) and a set of value blocks (for storing values) of key-value pairs. In this way, nodes of a KVS tree can store keys separate from their corresponding values. Each node can comprise an ordered (e.g., temporally ordered) sequence of key-value sets (also referred to herein as kvsets). Where temporally ordered, later key-value sets in the sequence can represent older key-value sets. The kvsets can comprise one or more key-value pairs, which permit values to be stored in the KVS tree with corresponding keys that reference the values. Accordingly, within a KVS tree, kvsets function as individual key and value stores organized in the nodes of the KVS tree. The key-value pairs within a given kvset may be key-sorted. Every key within a given kvset may be unique from the other keys in the kvset; however, keys within the KVS tree may not be unique (e.g., two different kvset within a single node or in different nodes of the KVS tree may include the same key). Each kvset may be immutable once written to a node (e.g., once placed/stored in a node, a kvset does not change). Though a kvset within a node may be immutable, the kvset may be deleted or some or all of the kvset's data contents may be added to a new kvset.

A kvset may comprise a key tree to store key entries of key-value pairs of the kvset, where a given key entry may comprise both a key and a reference to a value. A variety of data structures may be used to efficiently store and retrieve unique keys in the key tree (e.g., it may not even be a data tree), such as binary search trees, B-trees, etc. For example, the keys are stored in leaf nodes of the key tree, where a maximum key in any subtree of the key tree may be in a rightmost entry of a rightmost child, a rightmost edge of a first node of the key tree is linked to a sub-node of the key tree, and all keys in a subtree rooted at the sub-node of the key tree may be greater than all keys in the first node of the key tree.

For some embodiments, key entries of the kvset are stored in a set of key data blocks (also referred to as key blocks or kblocks), which can comprise a primary key block and zero or more extension key blocks. Members of the set of key blocks may correspond to media data blocks (media blocks) for a data storage medium implemented by a memory device, such as an SSD, hard disk drive, etc. Each key block may comprise a header to identify it as a key block, and a primary key block of a kvset may comprise a list of media block identifications for the one or more extension key blocks of the kvset.

A primary key block may comprise a header to a key tree of the kvset. The header may comprise a number of values to assist or facilitate interactions with the keys, or kvset. For example, the primary key block, or header stored therein, may comprise a copy of a lowest key in a key tree of the kvset, or a copy of a highest key in a key tree of the kvset. The primary key block may comprise a list of media block identifications for a key tree of the kvset. Additionally, the primary key block may comprise a bloom filter header for a bloom filter of the kvset, and the primary key block may comprise a list of media block identifications for a bloom filter of the kvset.

For some embodiments, values of a kvset are stored in a set of value data blocks (also referred to herein as value blocks or vblocks). Each particular value block in the KVS tree may have a data generation number associated with it that indicates a sequence order at which the particular value block was initially generated for the KVS tree. In this way, the data generation number of a particular value block can serve as a time stamp for when the particular value block is initially generated. For instance, data generation numbers may start at a value of "1" for the first value block generated and added to (e.g., a kvset of) a root node of the KVS tree, and the second value block generated and added to (e.g., a kvset of) the root node of the KVS tree would have a data generation number of "2." The data generation number increases with each new value block that is generated and added to the KVS tree through the root node.

Members of the set of value blocks may correspond to media data blocks (media blocks) for a data storage medium implemented by a memory device, which as noted herein can comprise an SSD, hard disk drive, etc. Each value block may comprise a header to identify it as a value block. A value block may comprise a storage section to store one or more values without separation between, where bits of a first value can run into bits of a second value on the data storage medium without a guard, container, or other delimiter between them. For various embodiments, a primary key block of a kvset comprises a list of media block identifications for value blocks in the set of value blocks for the kvset. In this way, a primary key block can manage storage references to value blocks within a kvset.

For some embodiments, a data marker associated with a key (hereafter, referred to as a tombstone) is used to indicate that the value corresponding to the key has been deleted. A tombstone may reside in the key entry in association with a key, and no value block space may be consumed for the key-value pair. According to some embodiments, the tombstone marks the deletion of the value associated with the key while avoiding the possibly expensive operation of purging the value from a KVS tree. For some embodiments, when a tombstone is encountered during a temporally ordered search of a KVS tree for a given key, a search process knows that a value corresponding to the given key has been deleted, even if an expired version of the key-value pair associated with that given key resides at a lower (e.g., older) location within the KVS tree.

For some embodiments, the primary key block includes a set of metrics for the kvset. For example, the set of metrics may comprise one or more of the following: a total number of keys stored in the kvset; or a number of keys with tombstone values stored in the kvset; a sum of all key lengths for keys stored in the kvset; a sum of all value lengths for keys stored in the kvset. The last two metrics may provide at least an approximate (if not exact) amount of storage consumed by the kvset. The set of metrics may also comprise, for example, an amount of unreferenced data in value-blocks (e.g., unreferenced values) of the kvset. This last metric can provide an estimate of the space that may be reclaimed in a maintenance operation (e.g., garbage collection operation performed on the KVS tree).

Disclosed herein are some examples of systems that perform operations relating to selectively using a portion of a key with a KVS tree as described herein.

FIG. 1 illustrates an example computing environment 100 including a memory sub-system 110, in accordance with some examples of the present disclosure. The memory sub-system 110 can include media, such as memory components 112A to 112N. The memory components 112A to 112N can be volatile memory devices, non-volatile memory devices, or a combination of such. In some embodiments, the memory sub-system 110 is a storage system. An example of a storage system is an SSD. In some embodiments, the memory sub-system 110 is a hybrid memory/storage system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or a direct communicative connection (e.g., without intervening components), whether wired or wireless, including connections such as electrical, optical, magnetic, and so forth. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative- and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component can include both an SLC portion and an MLC portion of memory cells. Each of the memory cells can store one or more bits of data (e.g., data blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor or controller separate from the memory sub-system 110).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory components 112A to 112N.

Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115.

The host system 120 includes a key portion selective use component 122 for key-value store (KVS) tree that can cause selective use of a portion of a key when performing an operation within a KVS tree stored on data storage media (e.g., media pool) implemented by one or more of the memory components 112A to 112N. The KVS tree stored on the data storage media may be one generated by the host system 120, by the memory sub-system 110 (e.g., by the memory sub-system controller 115 at the request of the host system 120), or some combination thereof. Depending on the embodiment, the key portion selective use component 122 may be part of an application or an operating system (e.g., operating system software driver for the memory sub-system 110) on the host system 120. In some embodiments, the memory sub-system 110 includes at least a portion of the key portion selective use component 122. For example, the memory sub-system controller 115 can include a processor 117 (e.g., a processing device) configured to execute instructions stored in local memory 119 for performing the operations described herein.

The key portion selective use component 122 enables selective use of one or more different portions of a key when performing an operation with respect to a KVS tree. For example, when performing a certain operation with respect to the KVS tree (e.g., navigation, search, or storage operation) based on a given key, the key portion selective use component 122 can enable use of a first portion (e.g., prefix) of the given key to perform the operation with respect to a first set of levels of the KVS tree (e.g., first series of levels starting from level one to level L), and enable use of a second portion (e.g., entire portion) of the given key (different from the first portion) to perform the operation with respect to a second set of levels of the KVS tree (e.g., second series of levels starting from level L+1 and below). For instance, the key portion selective use component 122 can cause a bit string representation (e.g., hash) of a prefix of the given key to be used to navigate between child nodes within the first set of levels of the KVS tree, and then cause a bit string representation (e.g., hash) of the entire portion of the given key to be used to navigate between child nodes within the second set of levels of the KVS tree. Such a navigation operation may occur, for example, during a search process for a given key-value pair associated with the given key within the KVS tree. One or more child nodes of the first set of levels can be navigated to based on a bit representation of the first portion of the given key, and searched for the given key-value pair. If none of the child nodes encountered within the first set of levels comprise the given key-value pair, one or more nodes of the second set of levels can be navigated to based on a bit representation of the second portion of the given key, and searched for the given key-value pair. If none of the child nodes encountered within the second set of levels comprise the key-value pair, the search process would indicate that the given key-value pair was not found in the KVS tree.

The key portion selective use component 122 can cause similar operations to occur when storing key-value pairs in the KVS tree to one or more child nodes based on their respective keys (e.g., during a move/spill operation that moves a key-value pair down one or more levels of the KVS tree). For instance, when storing a particular key-value pair associated with a particular key in a child node in a first set of levels of the KVS tree, a bit string representation of a first portion (e.g., prefix) of the particular key can be used to determine (e.g., identify) the child node (in the first set of levels) to which the particular key-value pair will be stored. Alternatively, when storing the particular key-value pair in a child node in a second set of levels of the KVS tree, a bit string representation of a second portion (e.g., entire portion) of the particular key can be used to determine (e.g., identify) the child node (in the second set of levels) to which the particular key-value pair will be stored.

Depending on the embodiment, the key portion selective use component 122 may comprise logic (e.g., a set of machine instructions, such as firmware) or one or more components that causes the memory sub-system 110 (e.g., the memory sub-system controller 115) to perform operations described herein with respect to the key portion selective use component 122. The key portion selective use component 122 may comprise a tangible unit capable of performing operations described herein. Further details with regards to the operations of the key portion selective use component 122 are described below.

Figure 2:
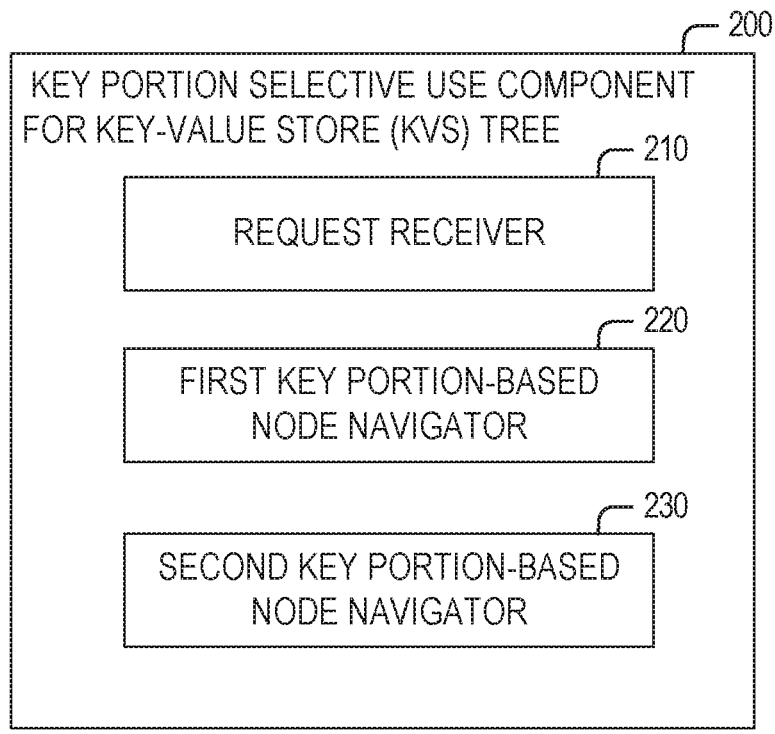
FIG. 2 is a block diagram of an example key portion selective use component for a key-value store (KVS) tree, in accordance with some implementations of the present disclosure.

FIG. 2 is a block diagram of an example key portion selective use component 200 for a KVS tree, in accordance with some implementations of the present disclosure. As illustrated, the key portion selective use component 200 comprises a request receiver 210, a first key portion-based node navigator 220, and a second key portion-based node navigator 230. For some embodiments, the key portion selective use component 200 may differ in components or arrangement (e.g., fewer or more components) than what is illustrated in FIG. 2. For instance, the key portion selective use component 200 can comprise additional key portion-based node navigators than those shown (e.g., each associated and used with a different set of levels of a KVS tree).

As noted herein, the KVS tree operated upon by the key portion selective use component 200 may be stored on a memory sub-system (e.g., 110) to facilitate selective use of one or more different portion of a key with respect to an operation performed on a KVS tree (e.g., navigation of the KVS tree or storage of data as one or more key-value pairs in one or more nodes of the KVS tree). The KVS tree may be part of a plurality of KVS trees that form a key-value store (KVS) database, which may comprise a multilevel tree with a base level comprising heterogeneous kvsets and a second level comprising the root nodes (and thus the start) of two or more KVS subtrees that each respectively comprises homogeneous kvsets. The KVS tree may be generated by a host system (e.g., 120), a memory sub-system (e.g., 110), or some combination thereof. The KVS tree may be generated, on a set of memory components, such that the KVS tree comprises a set of nodes, where a node in the set of nodes comprises a sequence of kvsets, and where a kvset in the sequence of kvsets comprises a set of key blocks for storing one or more keys and a set of value blocks for storing one or more values. The sequence of kvsets may be temporally ordered such that kvsets added earlier in the sequence represent older data (e.g., key-value pairs) relative to kvsets recently added.

The request receiver 210 receives a request, such as from a software application (e.g., user software application) running on a host system, to perform an operation with respect to a KVS tree. Examples of operations that may be requested include, without limitation, navigating (e.g., traversing the KVS tree) from one node on a particular level of the KVS tree to a child node on a next level of the KVS tree based on a key, searching the KVS tree for a key-value pair based on a key (e.g., provided within the request), iterating over a plurality of key-value pairs based on a key (where the plurality of key-value pairs are part of a set of keys with a common prefix key), and moving (e.g., spilling) a key-value pair down from a parent node on a particular level of the KVS tree to a child node on a next lower level of the KVS tree based on a key associated with the key-value pair. For various embodiments, operations requested for the KVS tree, such as searching, iterating, and moving, involve navigating from a parent node of the KVS tree to a child node of the KVS tree based on a key (e.g., traversing from a root node to a particular child node based on the key).

As described herein, based on a given key, navigating between nodes can comprise using a bit string representation (e.g., hash) of different portions of the given key to navigate between nodes within different sets of levels of the KVS tree. For the key portion selective use component 200, this is facilitated by the first key portion-based node navigator 220 and the second key portion-based node navigator 230.

In particular, for some embodiments, the first key portion-based node navigator 220 enables navigation from a parent node to child node within a first set of levels (e.g., a first series of levels) of the KVS tree based on a bit string representation of a first portion (e.g., first prefix) of a given key, and the second key portion-based node navigator 230 enables navigation from a parent node to child node within a second set of levels (e.g., a second series of levels) of the KVS tree based on a bit string representation of a second portion (e.g., entire portion) of the given key. For example, where a request for a search for a particular key-value pair based on a particular key is received by the request receiver 210, if the particular key-value pair is not located within a root node of the KVS tree, the first key portion-based node navigator 220 can enable traversal from the root node to one or more child nodes within levels 1 to L of the KVS tree based on a bit string representation (e.g., hash) of a prefix (e.g., first 8 bytes) of the given key, which in turn can enable those one or more child nodes to be searched for the particular key-value pair. If the particular key-value pair is not located within a root node of the KVS tree or at least one child node within levels 1 to L of the KVS tree, the second key portion-based node navigator 230 can enable traversal from the a child node at level L to one or more child nodes within levels L+1 and below of the KVS tree based on a bit string representation (e.g., hash) of an entire portion of the given key (e.g., the entire 64-byte key), which in turn can enable those one or more child nodes to be searched for the particular key-value pair.

Figure 3:
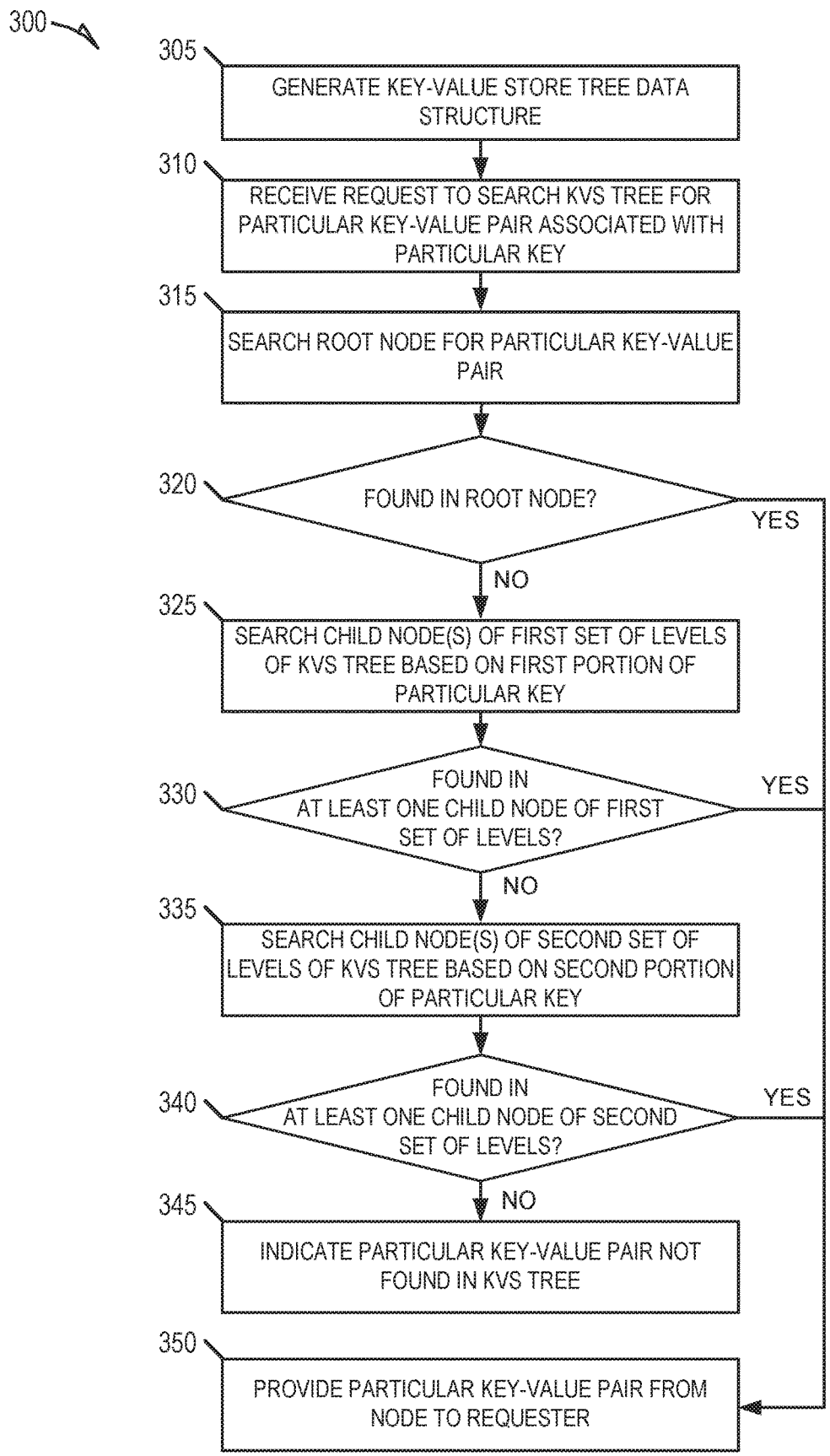
FIG. 3 is a flow diagram of an example method for selectively using a portion of a key with a KVS tree, in accordance with some implementations of the present disclosure.

FIG. 3 is a flow diagram of an example method 300 for selectively using a portion of a key with a KVS tree, in accordance with some implementations of the present disclosure. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device a combination thereof. In some embodiments, the method 300 is performed by the host system 120 of FIG. 1. In these embodiments, the method 300 may be performed, at least in part, by the key portion selective use component 122. Alternatively, the method 300 of FIG. 3 is performed by the memory sub-system 110 of FIG. 1 (e.g., the processor 117 of the memory sub-system controller 115). Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. Operations of the method 300 of FIG. 3 may be concurrently performed with respect to two or more nodes of the KVS tree.

Though the method 300 of FIG. 3 is illustrated and described with respect to searching nodes of the KVS tree based on selective use of different key portions for a key-value pair according to tree levels, for some embodiments, techniques similar to those of method 300 are applied to perform other operations with respect to the KVS tree, such as storing or moving a key-value pair within the KVS tree.

At operation 305, a processing device of a host system (e.g., 120) generates, on a memory sub-system (e.g., 110), a key-value store tree data structure (KVS tree) that comprises a set of nodes, where a node in the set of nodes comprises a set of key-value pairs. For some embodiments, each node in the set of nodes comprises a sequence of key-value sets (kvsets), and a kvset in the sequence of kvsets comprises a set of key blocks for storing one or more keys and a set of value blocks for storing one or more values. Alternatively, the KVS tree may be already generated (e.g., by another process) and, for some embodiments, the KVS tree is accessed at operation 305, where accessing the KVS tree can assist in subsequent operations of method 300 (e.g., operation 310).

At operation 310, the processing device of the host system receives a request to search the key-value store tree data structure for a particular key-value pair associated with a particular key. The request can be generated in response to a data request by a software application (e.g., user application) operating on the host system. As noted herein, for some embodiments, the request for a search may be part of a larger operation being performed on the key-value store tree data structure. In response to receiving the request at operation 310, at operation 315, the processing device of the host system searches a root node of the key-value store tree data structure (e.g., generated by operation 305) for the particular key-value pair associated with the particular key.

If the processing device of the host system determines (at operation 320) the particular key-value pair is not found in the root node (the root node does not comprise the particular key-value pair), the method 300 proceeds to operation 325. Alternatively, if the processing device of the host system determines (at operation 320) the particular key-value pair is found in the root node (the root node comprises the particular key-value pair), the method 300 proceeds to operation 350. For some embodiments, by proceeding to operation 325, the method 300 can search the key-value store tree data structure, based on the key, for a child node that comprises the particular key-value pair.

At operation 325, the processing device of the host system searches one or more child nodes of a first set of levels of the key-value store tree data structure based on a first portion of the particular key. For some embodiments, the first set of levels comprises a first series of levels of the key-value store tree data structure, such as a series comprising level one to level L of the key-value store tree data structure. For some embodiments, the first portion of the particular key comprises a prefix of the key, where the prefix can comprise at least one of a first N number of bytes of the key or a first N number of characters of the key. Additionally, for some embodiments, the first portion of the particular key comprises a non-prefix portion of the particular key, such as a particular portion of the particular key offset from a start of the key. Searching the one or more child nodes of the first set of levels of the key-value store tree data structure based on the first portion of the particular key can comprise searching the one or more child nodes of the first set of levels of the key-value store tree data structure based on a bit string representation of the first portion of the particular key, which for example can be generated by applying a hash function (e.g., a first hash function) to the first portion of the particular key. For some embodiments, two different portions of a key (e.g., a prefix of the key and an entire portion of the key) use two different hash functions to generate their respective bit string representations.

At operation 325, searching the one or more child nodes of the first set of levels of the key-value store tree data structure based on the first portion of the particular key can comprise navigating (e.g., from a root node or a parent node in the first set of levels) to a first child node of a first set of levels based on the first portion of the particular key, and searching the first child node for the particular key-value pair. In response to determining that the first child node does not comprise the particular key-value pair, operation 325 can navigate from the first child node to a second child node of the first set of levels based on the first portion of the particular key, and search the second child node for the particular key-value pair. The first node can be at a first level in the first set of levels and the second child node can be at a second level in the first set of levels, where the second level is the next level beneath the first level. In response to determining that the second child node does not comprise the particular key-value pair, operation 325 can continue to navigate and search one or more child nodes at lower levels in the first set of levels of the key-value store tree data structure until the particular key-value pair is found in one of the child nodes or the lowest level in the first set of levels is reached.

If the processing device of the host system determines (at operation 330) the particular key-value pair is not found in at least one child node of the first set of levels of the key-value store tree data structure (at least one child node of the first set of levels does not comprise the particular key-value pair), the method 300 proceeds to operation 335. Alternatively, if the processing device of the host system determines (at operation 330) the particular key-value pair is found in at least one child node of the first set of levels (at least one child node of the first set of levels comprises the particular key-value pair), the method 300 proceeds to operation 350.

At operation 335, the processing device of the host system searches one or more child nodes of a second set of levels of the key-value store tree data structure based on a second portion of the particular key, where the second portion is different from the first portion. For some embodiments, the second set of levels comprises a second series of levels of the key-value store tree data structure that does not overlap with a first series of levels associated with the first portion of the particular key. The second series of levels can follow the first series of levels such that the second series of levels comprise levels L+1 and below of the key-value store tree data structure. The second portion of the particular key is different from the first portion of the particular key, and the second portion may or may not partially overlap with the first portion. Depending on the embodiment, the second portion can comprise the entire portion of the particular key, a second prefix of the particular key, or some other portion of the particular key (e.g., a particular portion of the particular key offset from a start of the key). Additionally, for some embodiments, the second portion of the particular key comprises a second prefix of the key, where the second prefix can comprise at least one of a first N+M number of bytes of the key or a first N+M number of characters of the key (where M>0). Searching the one or more child nodes of the second set of levels of the key-value store tree data structure based on the second portion of the particular key can comprise searching the one or more child nodes of the second set of levels of the key-value store tree data structure based on a bit string representation of the second portion of the particular key, which for example can be generated by applying a hash function (e.g., a second hash function different from the first hash function) to the second portion of the particular key.

If the processing device of the host system determines (at operation 340) the particular key-value pair is not found in at least one child node of the second set of levels of the key-value store tree data structure (at least one child node of the second set of levels does not comprise the particular key-value pair), the method 300 proceeds to operation 345. Alternatively, if the processing device of the host system determines (at operation 340) the particular key-value pair is found in at least one child node of the second set of levels (at least one child node of the second set of levels comprises the particular key-value pair), the method 300 proceeds to operation 350.

At operation 345, the processing device of the host system indicates (e.g., sends a response to the requester that sent the request at operation 310) that the particular key-value pair is not found in the KVS tree (that at least one child node of the second set of levels does not comprise the particular key-value pair). Alternatively, at operation 350, the processing device of the host system provides the particular key-value pair from a node of the KVS tree identified (by operation 320, 330, 340) to a requester that sent the request at operation 310.

Figure 4:
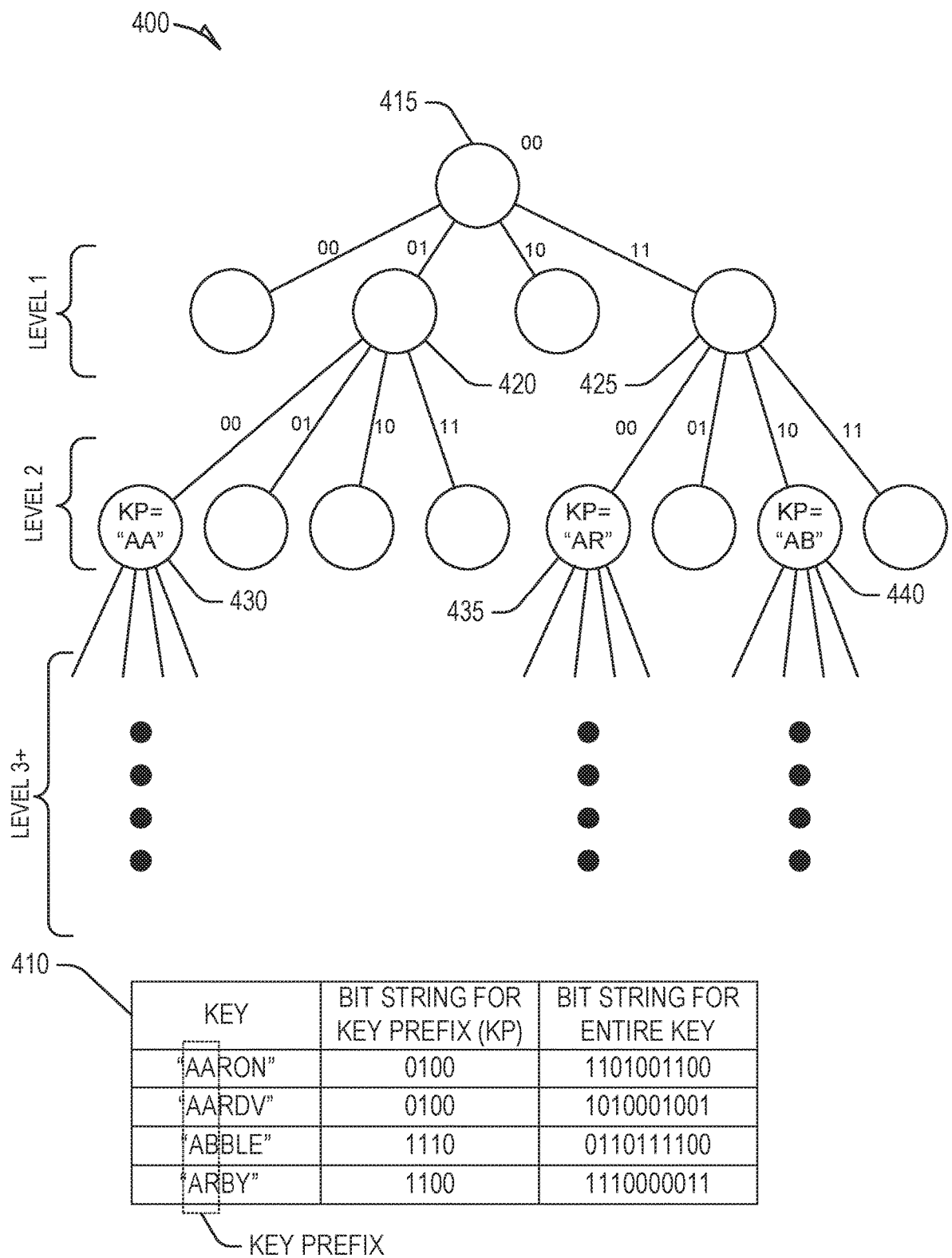
FIG. 4 is a diagram illustrating an example KVS tree that implements selective use of a portion of a key, in accordance with some implementations of the present disclosure.

FIG. 4 is a diagram illustrating an example KVS tree 400 that implements selective use of a portion of a key, in accordance with some implementations of the present disclosure. As illustrated, the KVS tree 400 comprises a root node 415, child nodes at level 1 of the KVS tree 400, child nodes at level 2 of the KVS tree 400, and additionally child nodes (not fully illustrated) at levels 3 and below of the KVS tree 400. In accordance with some embodiments, in FIG. 4, levels 1 and 2 of the KVS tree 400 are navigated based on a bit string representation of a key prefix of a key (comprising two characters of a key), and levels 3 and below of the KVS tree 400 are navigated based on a bit string representation of an entire portion of the key. As illustrated in table 410, the bit string representation of the key prefix "AA" comprises 0100, the key prefix "AB" comprises 1110, and the key prefix "AR" comprises 1100. In contrast, as illustrated in table 410, the bit string representation of the entire key "AARON" comprises 1101001100, the bit string representation of the entire key "AARDV" comprises 1010001001, the bit string representation of the entire key "ABBLE" comprises 0110111100, the bit string representation of the entire key "ARBY" comprises 1110000011. In table 410, the bit representation of the key prefixes may have been generated by applying a first hash function to the respective key prefixes, while the bit representation of the entire keys may have been generated by applying a second hash function (different from the first hash function) to the respective entire keys.

Based on navigating the KVS tree 400 by consuming two bits of the bit string for each level of the KVS tree 400, navigating the KVS tree 400 for all keys having a common key prefix "AA" would result in a navigation path to child node 430; navigating the KVS tree 400 for all keys having a common key prefix "AB" would result in a navigation path to child node 440; and navigating the KVS tree 400 for all keys having a common key prefix "AR" would result in a navigation path to child node 435. Subsequently, according to some embodiments, navigating from level 2 to levels 3 and below would be based on consuming two bits of the bit string representation of an entire key for each level of the KVS tree 400. Accordingly, navigating from a child node in level 2 of the KVS tree down to one or more child nodes in levels 3 and below of the KVS tree 400, based on two different keys with a common prefix, could result in two different navigation paths. For instance, navigating from the child node 430 to another child node in level 3 of the KVS tree 400 based on the key "AARON" (which has a bit string representation of 1101001100) would result in a different navigation path than navigating from the child node 430 to another child node in level 3 of the KVS tree 400 based on the key "AARDV" (which has a bit string representation of 1010001001), as the bit string representation of "AARON" starts with 11 and the bit string representation of "AARDV" starts with 10.

Figure 5:
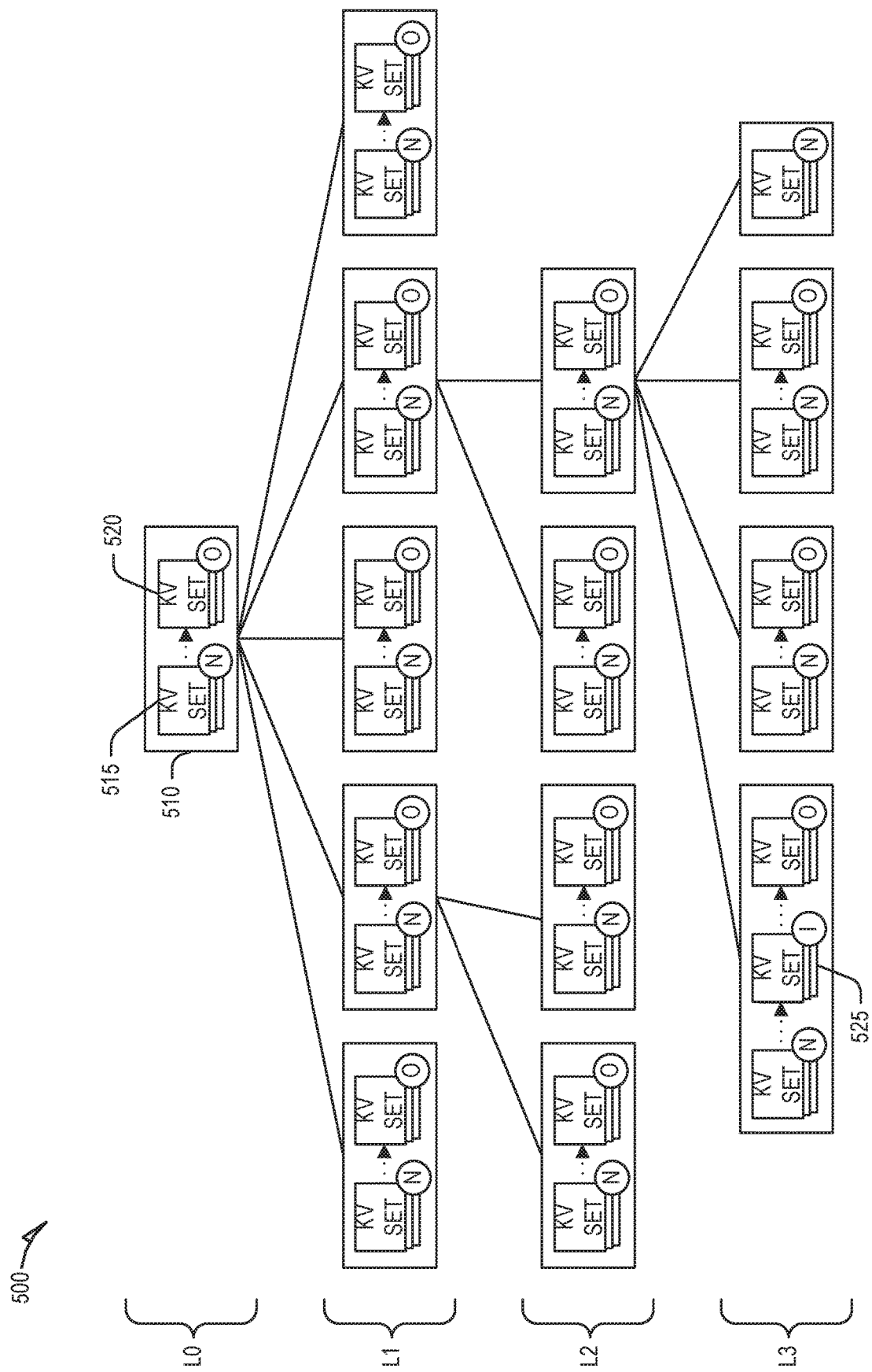
FIG. 5 is a block diagram illustrating an example KVS tree that can implement selective use of a portion of a key, in accordance with some implementations of the present disclosure.

FIG. 5 is a block diagram illustrating an example KVS tree 500 that can implement selective use of a portion of a key, in accordance with some implementations of the present disclosure. As noted herein, the KVS tree 500 comprises a key-value data structure that is organized as a tree. As a key-value data structure, values are stored in the KVS tree 500 with corresponding keys that reference the values. Specifically, key-entries may be used to contain both the key and additional information, such as a reference to the value. Keys themselves may have a total ordering within the KVS tree 500 and, as such, keys may be sorted amongst each other. Keys may also be divided into sub-keys, where the sub-keys are non-overlapping portions of a key. For some embodiments, the total ordering of keys is based on comparing like sub-keys between multiple keys (e.g., a first sub-key of a key is compared to the first sub-key of another key). Additionally, for some embodiments, a key prefix can comprise one or more sub-keys.

The KVS tree 500 comprises one or more nodes, such as node 510, each of which includes one or more key-value sets (kvsets). For some embodiments, one or more nodes (such as the node 510) each comprises a temporally ordered sequence of kvsets. As illustrated, kvset 515 comprises an 'N' badge to indicate that it is the newest of the sequence while kvset 520 comprises an 'O' badge to indicate that it is the oldest of the sequence. Kvset 525 comprises an 'I' badge to indicate that it is intermediate in the sequence. These badges are used throughout to label kvsets; however, another badge (such as an 'X') denotes a specific kvset rather than its position in a sequence (e.g., new, intermediate, old, etc.), unless it is a tilde '~', in which case it is simply an anonymous kvset. As is explained in greater detail below, older kvsets (with older key blocks) occur lower in the KVS tree 500. Thus, pushing (e.g., spilling) kvsets down a tree-level, such as from L1 to L2, results in at least one new kvset, from a parent node, to be added to the newest position in a recipient child node of the parent node.

The KVS tree 500 comprises a determinative mapping for a key-value pair (stored by a key block and a value block) in a kvset of a given node (e.g., the node 510) to any one child node of the given node (e.g., any one of the child nodes of the node 510, which are represented by all the nodes at L1). The determinative mapping of the KVS tree 500 can mean that, given a key, an external entity could trace a path through nodes of the KVS tree 500 to a key block and a value block (of a key-value pair) for the key without knowing the contents of the KVS tree 500. This, for example, is different than a B-tree, for example, where the contents of the tree will determine where a given key's value will fall in order to maintain the search-optimized structure of the tree. In contrast, the determinative mapping of the KVS tree 500 can provide a rule such that, for example, given a key, one may calculate the child node at L3 the key would map to even if the maximum tree-level (e.g., tree depth) is only at L1 at the moment. For some embodiments, the determinative mapping comprises a portion of a hash of a portion of the key. A sub-key may be hashed to arrive at a mapping set, and a portion of the mapping set may be used for any given level of the tree. Depending on the embodiment, the portion of the key may comprise the entire key.

For some embodiments, the hash comprises a multiple of non-overlapping portions including the portion of the hash. For instance, each of the multiple of non-overlapping portions may correspond to a level of the tree. The portion of the hash may be determined from the multiple of non-overlapping portions by a level of the node. Accordingly, a maximum number of child nodes for the node may be defined by a size of the portion of the hash, where the size of the portion of the hash may be a certain number of bits. For example, with respect to a hash of a key that results in eight bits, the eight bits may be divided into three sets comprising the first two bits, bits three through six, and bits seven and eight. Child nodes may be indexed based on the set of bits, such that child nodes at the first level (e.g., L1) have two bit names (based on bits one and two), child nodes on the second level (e.g., L2) have four-bit names (based on bits three through six), and child nodes on the third level (e.g., L3) have two bit names (based on bits seven and eight).

For some embodiments, the node 510 represents a root node of the KVS tree 500. The KVS tree 500 may be stored on data storage media implemented by a memory sub-system (e.g., 110), where the KVS tree 500 may be stored in media blocks of the data storage media. The media blocks of the data storage media may be block-addressable.

Figure 6A:
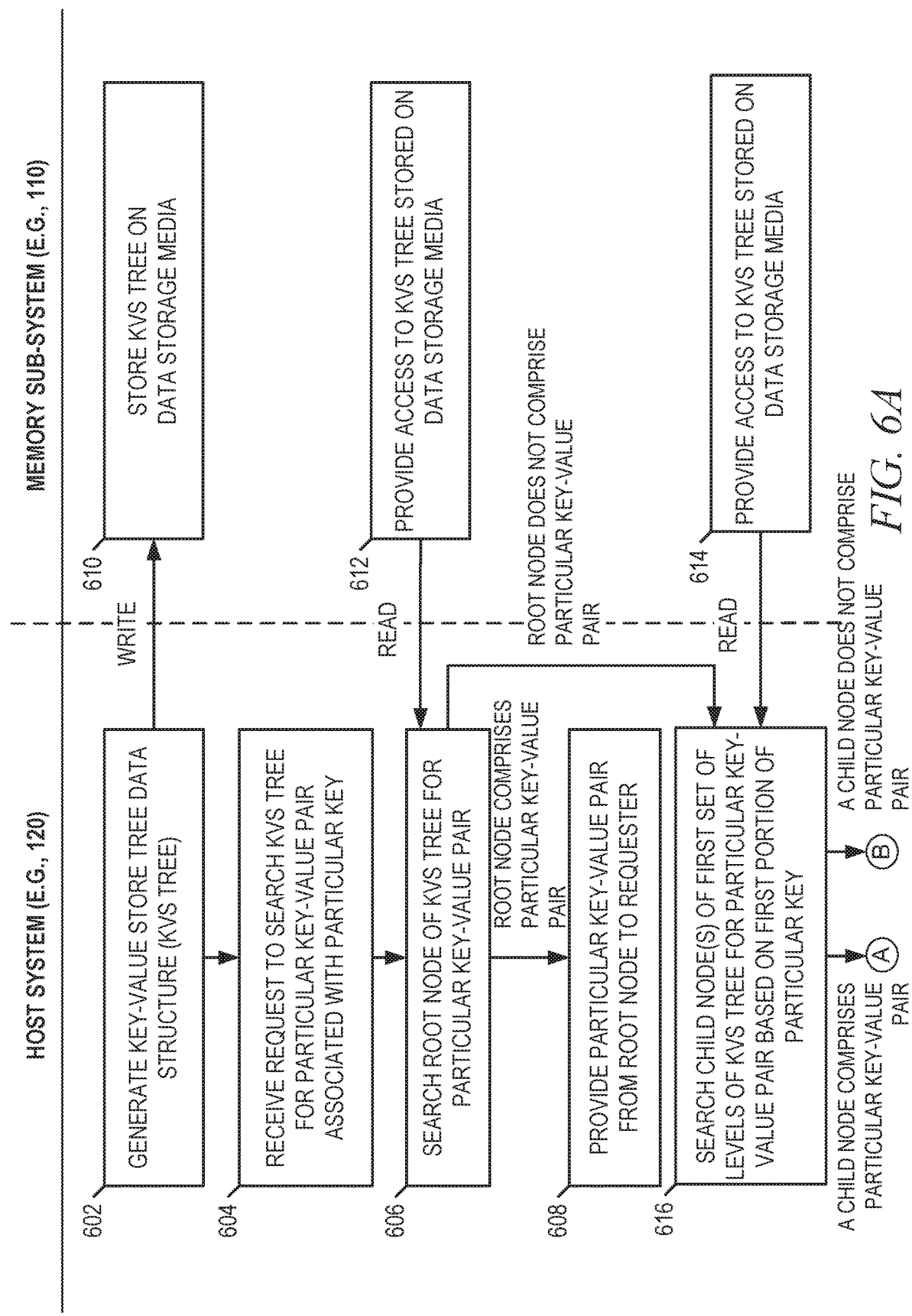
FIGS. 6A and 6B provide an interaction diagram illustrating interactions between components of a computing environment in the context of an example embodiment in which a method for selectively using a portion of a key is performed with respect to a KVS tree.
Figure 6B:
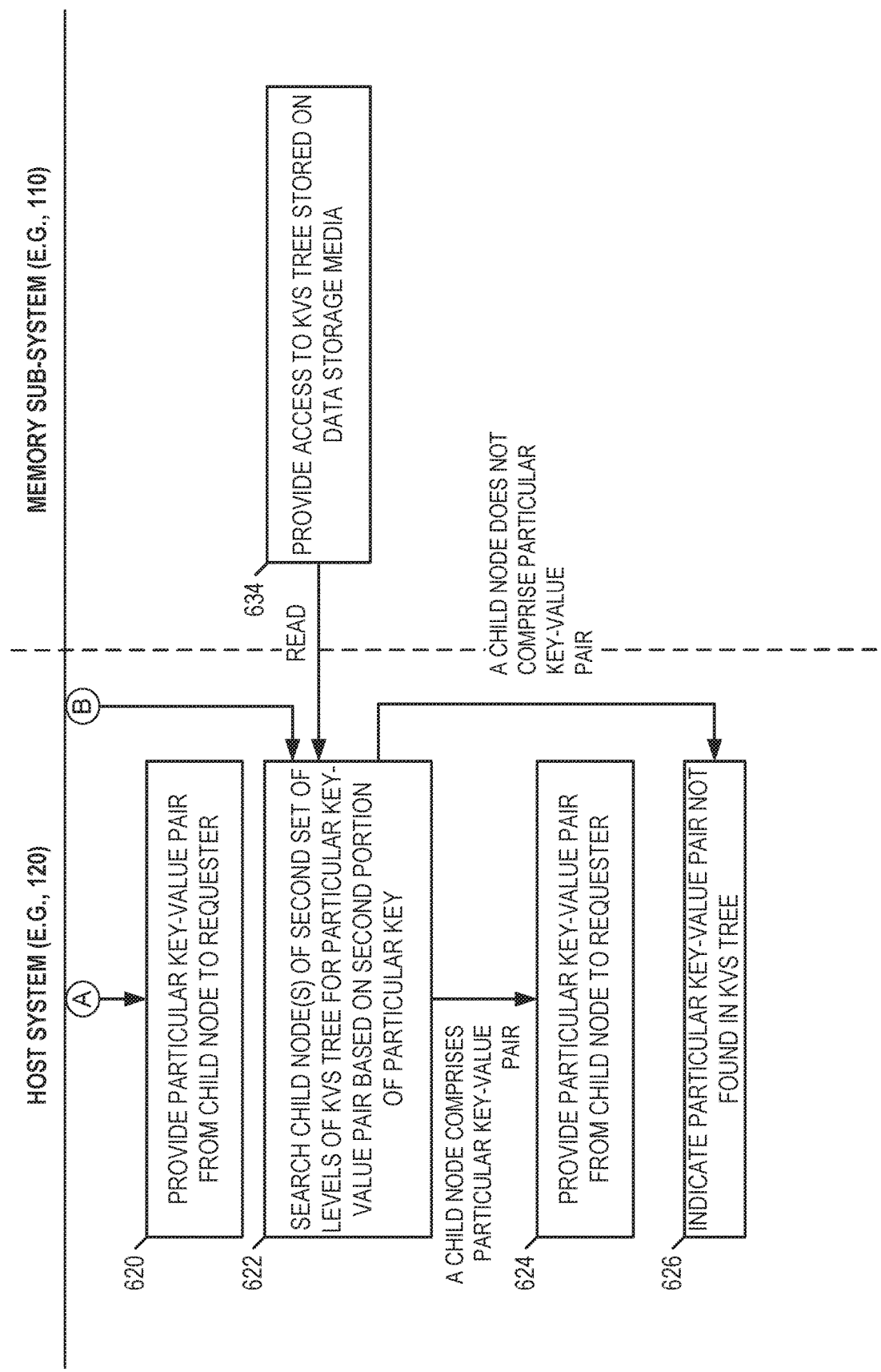

FIGS. 6A through 6B provide an interaction diagram illustrating interactions between components of the computing environment 100 in the context of an example embodiment in which a method for selective use of a portion of a key is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processings device), or a combination thereof. In some embodiments, the method is performed by the host system 120. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In the context of the example illustrated in FIGS. 6A through 6B, the host system can comprise the host system 120, and the memory sub-system can comprise the memory sub-system 110, where one or more of the memory components 112A to 112N can implement data storage media for storing a KVS tree operated by the host system 120.

As shown, at operation 602, the host system 120 generates a key-value store tree data structure (KVS tree), which the host system 120 writes to the memory sub-system 110 for storage. In response, at operation 610, the memory sub-system 110 stores the KVS tree on data storage media.

At operation 604, the host system 120 receives a request to search the KVS tree for a particular key-value pair associated with a particular key. In response to the request, at operation 606, the host system 120 searches a root node of the KVS tree for the particular key-value pair. To do so, the host system 120 reads the KVS tree (e.g., to search the root node stored on the KVS tree) stored on the data storage media of the memory sub-system 110, and the memory sub-system 110 provides access to the KVS tree at operation 612. If the host system 120 determines that the root node does not comprise the particular key-value pair, the host system 120 proceeds to operation 616 and, if the host system 120 determines that the root node does comprise the particular key-value pair, the host system 120 proceeds to operation 608.

At operation. 608, the host system 120 provides the key-value pair from the root node to the requester that sent/generated the request received at operation 604. Alternatively, at operation 616, the host system 120 searches one or more child nodes of a first set of levels (e.g., first series of levels) of the KVS tree for the particular key-value pair based on a first portion of the particular key (e.g., based on a bit representation generated by a hash of the prefix of the particular key). To do so, the host system 120 reads the KVS tree (e.g., to search the one or more child nodes of the first set of levels stored in the KVS tree) stored on the data storage media of the memory sub-system 110, and the memory sub-system 110 provides access to the KVS tree at operation 614. If the host system 120 determines that at least one child node in the first set of levels does not comprise the particular key-value pair, the host system 120 proceeds to operation 622 and, if the host system 120 determines that at least one child node in the first set of levels does comprise the particular key-value pair, the host system 120 proceeds to operation 620.

At operation 620, the host system 120 provides the key-value pair from the at least one child node of the first set of levels to the requester that sent/generated the request received at operation 604. Alternatively, at operation 622, the host system. 120 searches one or more child nodes of a second set of levels (e.g., second series of levels) of the KVS tree for the particular key-value pair based on a second portion of the particular key (e.g., based on a hit representation generated by a hash of the entire portion of the particular key). To do so, the host system 120 reads the KVS tree (e.g., to search the one or more child nodes of the second set of levels stored in the KVS tree) stored on the data storage media of the memory sub-system 110, and the memory sub-system 110 provides access to the KVS tree at operation 634. If the host system 120 determines that at least one child node in the second set of levels does not comprise the particular key-value pair, the host system 120 proceeds to operation 626 and, if the host system 120 determines that at least one child node in the second set of levels does comprise the particular key-value pair, the host system 120 proceeds to operation 626.

At operation 624, the host system 120 provides the key-value pair from the at least one child node of the second set of levels to the requester that sent/generated the request received at operation 604. Alternatively, at operation 626, the host system 120 indicates that the particular key-value pair is not found in the KVS tree.

Figure 7:
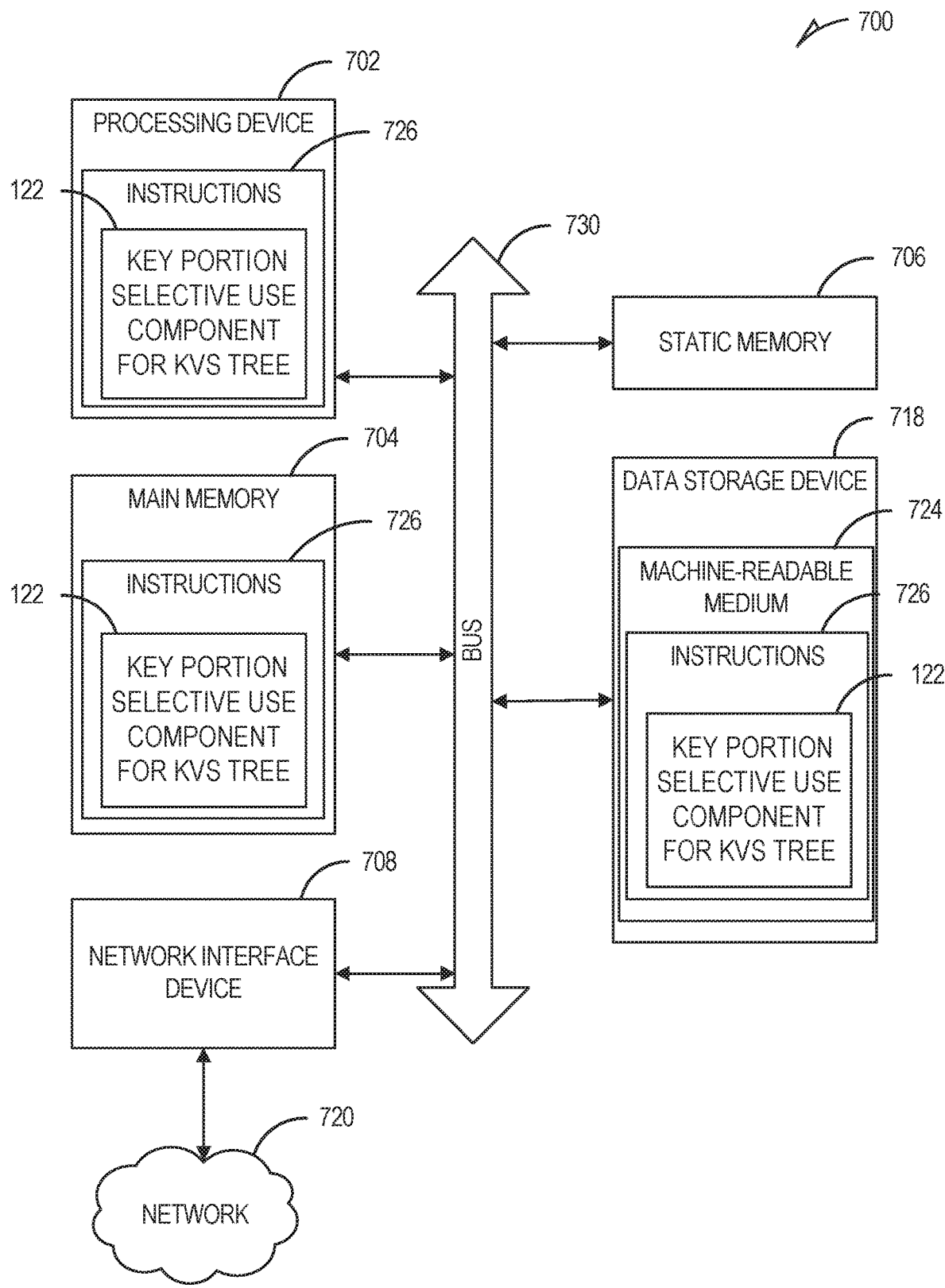
FIG. 7 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the key portion selective use component 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage device 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage device 718, and/or main memory 704 can correspond to the memory sub-system 110 of FIG. 1.

In one embodiment, the instructions 726 include instructions to implement functionality corresponding to a parity calculator with partial calculation tracking (e.g., the key portion selective use component 122 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader embodiments of the disclosure as set forth in the following claims. The specification and drawings are, accordingly, to be regarded in an illustrative sense rather than a restrictive sense.

EXAMPLES

Example 1 is a system comprising: a set of memory components storing a key-value store tree data structure, the key-value store tree data structure comprising a set of nodes, wherein a node in the set of nodes comprises a set of key-value pairs; and a processing device, operatively coupled to the set of memory components, configured to perform operations comprising: receiving a request to search the key-value store tree data structure for a particular key-value pair associated with a particular key; in response to the request, searching a root node of the key-value store tree data structure for the particular key-value pair associated with the particular key; and in response to determining that the root node does not comprise the particular key-value pair, searching the key-value store tree data structure, based on the key, for a child node that comprises the particular key-value pair, the searching comprising: searching one or more child nodes of a first set of levels of the key-value store tree data structure based on a first portion of the particular key; and in response to determining that at least one child node of the first set of levels of the key-value store tree data structure does not comprise the particular key-value pair, searching one or more child nodes of a second set of levels of the key-value store tree data structure based on a second portion of the key, the second portion being different from the first portion.

In Example 2, the subject matter of Example 1 optionally includes where the first portion of the particular key comprises a prefix of the key.

In Example 3, the subject matter of Example 1 or Example 2 optionally includes where the prefix of the particular key comprises a first N number of bytes of the key.

In Example 4, the subject matter of any one of Examples 1 to 3 optionally includes where the second portion of the particular key comprises a second prefix of the key.

In Example 5, the subject matter of any one of Examples 1 to 4 optionally includes where the second portion of the particular key comprise an entire portion of the key.

In Example 6, the subject matter of any one of Examples 1 to 5 optionally includes where the first set of levels comprises a first series of levels of the key-value store tree data structure, the second set of levels comprises a second series of levels, and the first series of levels does not overlap with the second series of levels.

In Example 7, the subject matter of any one of Examples 1 to 6 optionally includes where the searching the one or more child nodes of the first set of levels of the key-value store tree data structure based on the first portion of the particular key comprises: navigating to a first child node of the first set of levels based on the first portion of the particular key; searching the first child node for the particular key-value pair; and in response to determining that the first child node does not comprise the particular key-value pair: navigating from the first child node to a second child node of the second set of levels based on the first portion of the particular key; and searching the second child node for the particular key-value pair.

In Example 8, the subject matter of any one of Examples 1 to 7 optionally includes where the searching the one or more child nodes of the first set of levels of the key-value store tree data structure based on the first portion of the particular key comprises: searching the one or more child nodes of the first set of levels of the key-value store tree data structure based on a hash of the first portion of the particular key.

In Example 9, the subject matter of any one of Examples 1 to 8 optionally includes where the searching the one or more child nodes of the second set of levels of the key-value store tree data structure based on the second portion of the particular key comprises: searching the one or more child nodes of the second set of levels of the key-value store tree data structure based on a hash of the second portion of the particular key.

In Example 10, the subject matter of any one of Examples 1 to 9 optionally includes where the first portion of the particular key comprises a particular portion of the particular key offset from a start of the key.

Example 11 is a method comprising: generating, on a set of memory components, a key-value store tree data structure, the key-value store tree data structure comprising a set of nodes, wherein a node in the set of nodes comprises a set of key-value pairs; receiving a request to search the key-value store tree data structure for a particular key-value pair associated with a particular key; in response to the request, searching a root node of the key-value store tree data structure for the particular key-value pair associated with the particular key; and in response to determining that the root node does not comprise the particular key-value pair, searching the key-value store tree data structure, based on the key, for a child node that comprises the particular key-value pair, the searching comprising: searching one or more child nodes of a first set of levels of the key-value store tree data structure based on a first portion of the particular key; and in response to determining that at least one child node of the first set of levels of the key-value store tree data structure does not comprise the particular key-value pair, searching one or more child nodes of a second set of levels of the key-value store tree data structure based on a second portion of the key, the second portion being different from the first portion.

In Example 12, the subject matter of Example 11 optionally includes where the first portion of the particular key comprises a prefix of the key.

In Example 13, the subject matter of Example 11 or Example 12 optionally includes where the prefix of the particular key comprises a first N number of bytes of the key.

In Example 14, the subject matter of any one of Examples 11 to 13 optionally includes where the second portion of the particular key comprises a second prefix of the key.

In Example 15, the subject matter of any one of Examples 11 to 14 optionally includes where the second portion of the particular key comprises an entire portion of the key.

In Example 16, the subject matter of any one of Examples 11 to 15 optionally includes where the first set of levels comprises a first series of levels of the key-value store tree data structure, the second set of levels comprises a second series of levels, and the first series of levels does not overlap with the second series of levels.

In Example 17, the subject matter of any one of Examples 11 to 16 optionally includes where the searching the one or more child nodes of the first set of levels of the key-value store tree data structure based on the first portion of the particular key comprises: navigating to a first child node of the first set of levels based on the first portion of the particular key; searching the first child node for the particular key-value pair; and in response to determining that the first child node does not comprise the particular key-value pair: navigating from the first child node to a second child node of the second set of levels based on the first portion of the particular key; and searching the second child node for the particular key-value pair.

In Example 18, the subject matter of any one of Examples 11 to 17 optionally includes where the searching the one or more child nodes of the first set of levels of the key-value store tree data structure based on the first portion of the particular key comprises: searching the one or more child nodes of the first set of levels of the key-value store tree data structure based on a hash of the first portion of the particular key.

In Example 19, the subject matter of any one of Examples 11 to 18 optionally includes where the searching the one or more child nodes of the second set of levels of the key-value store tree data structure based on the second portion of the particular key comprises: searching the one or more child nodes of the second set of levels of the key-value store tree data structure based on a hash of the second portion of the particular key.

Example 20 is a non-transitory machine-readable storage medium comprising instructions that, when executed by a processing device, cause the processing device to: access, on a set of memory components, a key-value store tree data structure, the key-value store tree data structure comprising a set of nodes, wherein a node in the set of nodes comprises a set of key-value pairs; receive a request to search the key-value store tree data structure for a particular key-value pair associated with a particular key; in response to the request, search a root node of the key-value store tree data structure for the particular key-value pair associated with the particular key; and in response to determining that the root node does not comprise the particular key-value pair, searching the key-value store tree data structure, based on the key, for a child node that comprises the particular key-value pair, the searching comprising: search one or more child nodes of a first set of levels of the key-value store tree data structure based on a first portion of the particular key; and in response to determining that at least one child node of the first set of levels of the key-value store tree data structure does not comprise the particular key-value pair, searching one or more child nodes of a second set of levels of the key-value store tree data structure based on a second portion of the particular key, the second portion being different from the first portion.

What is claimed is:

1. A system comprising:
    a set of memory components storing a key-value store tree data structure, the key-value store tree data structure comprising a set of nodes, wherein a node in the set of nodes comprises a set of key-value pairs; and
    a processing device, operatively coupled to the set of memory components, configured to perform operations comprising:
        receiving a request to search the key-value store tree data structure for a particular key-value pair comprising a particular key;
        in response to receiving the request, searching a root node of the key-value store tree data structure for the particular key-value pair comprising the particular key; and
        in response to determining that the root node does not comprise the particular key-value pair, searching the key-value store tree data structure, based on the particular key, for a child node that comprises the particular key-value pair, the searching the key-value store tree data structure comprising:

searching one or more child nodes of a first set of levels of the key-value store tree data structure based on a first portion of the particular key, the first portion being less than all of the particular key; and in response to determining that at least one child node of the first set of levels of the key-value store tree data structure does not comprise the particular key-value pair, searching one or more child nodes of a second set of levels of the key-value store tree data structure based on a second portion of the particular key, the second portion being different from the first portion, and the second portion overlapping at least partially with the first portion.

2. The system of claim 1, wherein the first portion of the particular key comprises a prefix of the particular key.

3. The system of claim 2, wherein the prefix of the particular key comprises a first N number of bytes of the particular key.

4. The system of claim 2, wherein the second portion of the particular key comprises a second prefix of the particular key.

5. The system of claim 1, wherein the second portion of the particular key comprises all of the particular key.

6. The system of claim 1, wherein the first set of levels comprises a first series of levels of the key-value store tree data structure, the second set of levels comprises a second series of levels, and the first series of levels does not overlap with the second series of levels.

7. The system of claim 1, wherein the searching the one or more child nodes of the first set of levels of the key-value store tree data structure based on the first portion of the particular key comprises:

navigating to a first child node of the first set of levels based on the first portion of the particular key;

searching the first child node for the particular key-value pair; and in response to determining that the first child node does not comprise the particular key-value pair:

navigating from the first child node to a second child node of the first set of levels based on the first portion of the particular key; and searching the second child node for the particular key-value pair.

8. The system of claim 1, wherein the searching the one or more child nodes of the first set of levels of the key-value store tree data structure based on the first portion of the particular key comprises:

searching the one or more child nodes of the first set of levels of the key-value store tree data structure based on a hash of the first portion of the particular key.

9. The system of claim 8, wherein the searching the one or more child nodes of the second set of levels of the key-value store tree data structure based on the second portion of the particular key comprises:

searching the one or more child nodes of the second set of levels of the key-value store tree data structure based on a hash of the second portion of the particular key.

10. The system of claim 1, wherein the first portion of the particular key comprises a particular portion of the particular key offset from a start of the particular key.

11. A method comprising:

generating, on a set of memory components, a key-value store tree data structure, the key-value store tree data structure comprising a set of nodes, wherein a node in the set of nodes comprises a set of key-value pairs;

receiving a request to search the key-value store tree data structure for a particular key-value pair with comprising a particular key;

in response to receiving the request, searching a root node of the key-value store tree data structure for the particular key-value pair comprising the particular key; and in response to determining that the root node does not comprise the particular key-value pair, searching the key-value store tree data structure, based on the particular key, for a child node that comprises the particular key-value pair, the searching the key-value store tree data structure comprising:

searching one or more child nodes of a first set of levels of the key-value store tree data structure based on a first portion of the particular key, the first portion being less than all of the particular key; and in response to determining that at least one child node of the first set of levels of the key-value store tree data structure does not comprise the particular key-value pair, searching one or more child nodes of a second set of levels of the key-value store tree data structure based on a second portion of the particular key, the second portion being different from the first portion, and the second portion overlapping at least partially with the first portion.

12. The method of claim 11, wherein the first portion of the particular key comprises a prefix of the particular key.

13. The method of claim 12, wherein the prefix of the particular key comprises a first N number of bytes of the particular key.

14. The method of claim 12, wherein the second portion of the particular key comprises a second prefix of the particular key.

15. The method of claim 11, wherein the second portion of the particular key comprises all of the particular key.

16. The method of claim 11, wherein the first set of levels comprises a first series of levels of the key-value store tree data structure, the second set of levels comprises a second series of levels, and the first series of levels does not overlap with the second series of levels.

17. The method of claim 11, wherein the searching the one or more child nodes of the first set of levels of the key-value store tree data structure based on the first portion of the particular key comprises:

navigating to a first child node of the first set of levels based on the first portion of the particular key;

searching the first child node for the particular key-value pair; and in response to determining that the first child node does not comprise the particular key-value pair:

navigating from the first child node to a second child node of the first set of levels based on the first portion of the particular key; and searching the second child node for the particular key-value pair.

18. The method of claim 11, wherein the searching the one or more child nodes of the first set of levels of the key-value store tree data structure based on the first portion of the particular key comprises:

searching the one or more child nodes of the first set of levels of the key-value store tree data structure based on a hash of the first portion of the particular key.

19. The method of claim 18, wherein the searching the one or more child nodes of the second set of levels of the key-value store tree data structure based on the second portion of the particular key comprises:

searching the one or more child nodes of the second set of levels of the key-value store tree data structure based on a hash of the second portion of the particular key.

20. A non-transitory machine-readable storage medium comprising instructions that, when executed by a processing device, cause the processing device to:
   access, on a set of memory components, a key-value store tree data structure, the key-value store tree data structure comprising a set of nodes, wherein a node in the set of nodes comprises a set of key-value pairs;
   receive a request to search the key-value store tree data structure for a particular key-value pair comprising a particular key;
   in response to the request, search a root node of the key-value store tree data structure for the particular key-value pair comprising the particular key; and
   in response to determining that the root node does not comprise the particular key-value pair, searching the key-value store tree data structure, based on the particular key, for a child node that comprises the particular key-value pair, the searching the key-value store tree data structure comprising:
   search one or more child nodes of a first set of levels of the key-value store tree data structure based on a first portion of the particular key, the first portion being less than all of the particular key; and
   in response to determining that at least one child node of the first set of levels of the key-value store tree data structure does not comprise the particular key-value pair, searching one or more child nodes of a second set of levels of the key-value store tree data structure based on a second portion of the particular key, the second portion being different from the first portion, and the second portion overlapping at least partially with the first portion.

* * * * *